United States Patent
Bockstaller et al.

(10) Patent No.: US 9,182,616 B1
(45) Date of Patent: Nov. 10, 2015

(54) PHOTONIC BAND GAP STRUCTURE WITH TUNABLE OPTICAL AND ELECTRONIC PROPERTIES

(71) Applicant: Carnegie Mellon University, Pittsburgh, PA (US)

(72) Inventors: Michael R. Bockstaller, Pittsburgh, PA (US); Lisa M. Porter, Pittsburgh, PA (US); Sudarshan Narayanan, Pittsburgh, PA (US); Jihoon Choi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 111 days.

(21) Appl. No.: 13/958,425

(22) Filed: Aug. 2, 2013

Related U.S. Application Data

(60) Provisional application No. 61/742,089, filed on Aug. 2, 2012.

(51) Int. Cl.
*G02F 1/03* (2006.01)
*G02F 1/01* (2006.01)

(52) U.S. Cl.
CPC ........................................ *G02F 1/01* (2013.01)

(58) Field of Classification Search
USPC ......................................................... 359/245
See application file for complete search history.

(56) References Cited

U.S. PATENT DOCUMENTS

2005/0236556 A1* 10/2005 Sargent et al. ............. 250/214.1

* cited by examiner

*Primary Examiner* — James Jones
(74) *Attorney, Agent, or Firm* — Fish & Richardson P.C.

(57) ABSTRACT

In one aspect, a photonic band gap (PBG) structure comprises: a first conducting layer; a second conducting layer; and a nanocomposite layer between the first conducting layer and the second conducting layer, the nanocomposite layer comprising one or more composite materials and one or more nanoparticles dispersed within the one or more composite materials, with the one or more composite materials comprising a material that is optically transparent.

30 Claims, 7 Drawing Sheets

PHOTONIC BAND GAP STRUCTURE WITH TUNABLE OPTICAL AND ELECTRONIC PROPERTIES

STATEMENT REGARDING FEDERALLY SPONSORED RESEARCH AND DEVELOPMENT

This invention was made with partial government support under National Science Foundation grant ECCS0824188. The government has certain rights in the invention.

CLAIM OF PRIORITY

This application claims the benefit of priority under 35 U.S.C. §119(e) to provisional U.S. Patent Application No. 61/742,089, filed on Aug. 2, 2012, the entire contents of which are hereby incorporated by reference.

FIELD OF USE

The present disclosure relates to photonic band gap structures with tunable optical and electronic properties.

BACKGROUND

Photonic crystals may respond to incident light in a unique manner, exhibiting the presence of a "photonic bandgap" (PBG) in addition to tunable transmittance or reflectance. While light waves can propagate through a photonic crystal with a periodic dielectric structure, a periodic dielectric function (or index of refraction), called the photonic bandgap (PBG), may forbid propagation of light in certain directions and for certain ranges of wavelengths. Photonic crystals may be suitable for use in optical devices such as optical limiters, switches, diodes, and transistors.

PBG structures may serve as an alternative to conventional transparent materials. One-dimensional PBG materials are layered, periodic structures that include materials with different dielectric constants, and hence optical constants. The periodicity in the dielectric contrast for such structures gives rise to a PBG, the size of which depends on the dielectric contrast and the number and dimension of periods within the structure. A set of degenerate standing wave solutions to Maxwell's equations is obtained in the band edge regions such that, in the lower band edge, localization of the electric field intensity (of the incident electromagnetic wave) is maximized in the layer with higher dielectric constant (i.e., a higher refractive index), and vice versa for the higher band edge.

Metals, being conductive materials, with their free carrier plasma resonance or absorption frequencies usually inside the visible spectrum, are typically highly reflective and absorptive in all wavelength ranges of interest. Due to these characteristics, metals may be suitable for electromagnetic shielding applications, but less suitable for transparent conducting applications. However, when metal films are combined with dielectric materials that are transparent in a layered composite structure, the transparency or transmittance of the metal films can be enhanced by using a mechanism that has become known as optical resonant tunneling. In particular, if the thickness of the layers of the metal films and the dielectric materials is chosen such that, at the metal absorption frequency, the light and electric field is concentrated in the non-absorbing dielectric layers (e.g., when the metal absorption frequency is equal to the lower band edge frequency of the layered structure), then absorption by the metal films can effectively be suppressed. While these structures may conduct along the plane of the metal layers, out-of-plane or transverse conductance may be limited because of the presence of the insulating dielectric layers between the metal layers.

SUMMARY

The present disclosure describes methods and apparatus relating to a conductive structure that includes a PBG structure for enhancing the transparency of the conductive materials of the conductive structure. The conductive structure may be a laminated multilayer structure of alternating transparent and non-transparent materials. The conductive structure may exhibit mechanical flexibility and isotropic metal-like conductivity. In some implementations, out-of-plane (from layer to layer) conductivity is achieved by using a conducting polymer as the transparent material in the structure. In some implementations, out-of-plane conductivity is enhanced between planes of the structure through the use of conductive nanoparticles dispersed within the non-conductive materials. The conductive structure may be used for flexible transparent conducting composite materials with approximately isotropic conductivity. The conductive structure may, for example, replace the transparent conducting oxides in flexible electronics applications.

In one aspect of the present disclosure, a photonic band gap structure comprises: a first conducting layer; a second conducting layer; and a nanocomposite layer between the first conducting layer and the second conducting layer, the nanocomposite layer comprising one or more composite materials and one or more nanoparticles dispersed within the one or more composite materials, with the one or more composite materials comprising a material that is optically transparent; wherein an aggregate thickness of the first conducting layer, the second conducting layer, and the nanocomposite layer increases a concentration of light in the nanocomposite layer, relative to other concentrations of light in the nanocomposite layer that result from other aggregate thicknesses of the first conducting layer, the second conducting layer, and the nanocomposite layer; and wherein the increase in the concentration of light in the nanocomposite layer causes an increase in optical transmittances of the first conducting layer and the second conducting layer, relative to other optical transmittances of the first conducting layer and the second conducting layer.

Implementations of the disclosure can include one or more of the following features. The first conducting layer has an average thickness of 10 nanometers. The second conducting layer has an average thickness of 10 nanometers. The nanocomposite layer has an average thickness of 150 nanometers. Each of the first conducting layer and the second conducting layer comprises one or more of silver, gold, aluminum, copper, lithium, poly(3-hexylthiophene-2,5-diyl) (P3HT), carbon, and conducting polymer. The one or more composite materials of the nanocomposite layer comprises an insulating polymer. The polymer comprises polystyrene. The one or more nanoparticles of the nanocomposite layer comprise a conducting material. The conducting material comprises one or more of silver, gold, aluminum, copper, lithium, poly(3-hexylthiophene-2,5-diyl) (P3HT), carbon, tin, indium, and conducting polymer. The one or more nanoparticles form one or more respective conductive channels through the nanocomposite layer and between the first conducting layer and the second conducting layer. An average size of the one or more nanoparticles is 100 nanometers. The one or more nanoparticles of the nanocomposite layer comprise one or more electrochromic and photochromic materials. The one or more nanoparticles of the nanocomposite layer comprise one or more nonlinear absorbing materials. A first optical transmittance of the one or more composite materials prior to dispersion of the one or more nanoparticles into the one or more composite materials is substantially the same as a second optical transmittance of the one or more composite materials following dispersion of the one or more nanoparticles into the one or more composite materials. The PBG structure may include a transparent substrate on which the first conducting layer is formed. The PBG structure may include a third conducting layer; and another nanocomposite layer between the second conducting layer and the third conducting layer, with the other nanocomposite layer comprising one or more other composite materials and one or more other nanoparticles dispersed within the one or more other composite materials, with the one or more other composite materials comprising a material that is optically transparent; wherein an aggregate thickness of the second conducting layer, the third conducting layer, and the other nanocomposite layer increases a concentration of light in the other nanocomposite layer, relative to other concentrations of light in the other nanocomposite layer that result from other aggregate thicknesses of the second conducting layer, the third conducting layer, and the other nanocomposite layer, and wherein the increase in the concentration of light in the other nanocomposite layer causes an increase in optical transmittances of the second conducting layer and the third conducting layer, relative to other optical transmittances of the second conducting layer and the third conducting layer.

In another aspect of the present disclosure, a method for forming a photonic band gap structure comprises: depositing a first conducting material on a surface of a transparent substrate; depositing a solution on a surface of the deposited first conducting material, with the solution comprising an one or more composite materials and one or more nanoparticles dispersed within the on or more composite materials, with the one or more composite materials comprising a material that is optically transparent; and depositing a second conducting material on a surface of the deposited solution, wherein an aggregate thickness of the deposited first conducting layer, the deposited second conducting material, and the deposited solution increases a concentration of light in the deposited solution, relative to other concentrations of light in the solution that result from other aggregate thicknesses of the first conducting material, the second conducting material, and the solution; and wherein the increase in the concentration of light in the deposited solution causes an increase in optical transmittances of the deposited first conducting material and the deposited second conducting material, relative to other optical transmittances of the first conducting material and the second conducting material.

Implementations of the disclosure can include one or more of the following features. Depositing the first conducting material on the surface of the transparent substrate comprises: depositing the first conducting material using electron beam evaporation at an average rate of 0.5 Å/s under an average pressure of ~1×10$^{-10}$ torr. Depositing the second conducting material on the surface of the deposited solution comprises: depositing the second conducting material using electron beam evaporation at an average rate of 0.5 Å/s under an average pressure of ~1×10$^{-10}$ torr. At least one of the deposited first conducting material or the deposited second conducting material has an average thickness of 10 nanometers. Each of the first conducting material and the second conducting material comprises one or more of silver, gold, aluminum, copper, poly(3-hexylthiophene-2,5-diyl) (P3HT), carbon, and conducting polymer. Depositing the solution on the surface of the first conducting material comprises: spin coating the solution onto the surface of the first conducting material at an average rotation speed between 1500 rpm and 4000 rpm for an average time of 30 seconds. The deposited solution has an average thickness of 150 nanometers. The one or more composite materials comprises polystyrene of 2 wt % of m.wt 50,000 g/mol. The one or more nanoparticles of the solution comprise a conducting material. The conducting material comprises one or more of silver, gold, aluminum, copper, lithium, poly(3-hexylthiophene-2,5-diyl) (P3HT), carbon, tin, indium, and a conducting polymer. The one or more nanoparticles form one or more respective conductive channels between the deposited first conducting material and the deposited second conducting material through the deposited solution. An average size of the one or more nanoparticles is 100 nanometers. The one or more nanoparticles of the nanocomposite layer comprise one or more electrochromic and photochromic materials. The one or more nanoparticles of the nanocomposite layer comprise one or more nonlinear absorbing materials. A first optical transmittance of the one or more composite materials prior to dispersion of the one or more nanoparticles into the one or more composite materials is substantially the same as a second optical transmittance of the one or more composite materials following dispersion of the one or more nanoparticles into the one or more composite materials. The method may include depositing another solution on a surface of the deposited second conducting material, with the other solution comprising another one or more composite materials and one or more other nanoparticles dispersed within the other one or more composite materials, with the one or more composite materials comprising a material that is optically transparent; and depositing a third conducting material on a surface of the deposited other solution, wherein an aggregate thickness of the deposited second conducting layer, the deposited third conducting layer, and the deposited other solution increases a concentration of light in the deposited other solution, relative to other concentrations of light in the other solution that result from other aggregate thicknesses of the second conducting material, the third conducting material, and the other solution; and wherein the increase in the concentration of light in the deposited other solution causes an increase in optical transmittances of the deposited second conducting material and the deposited third conducting material, relative to other optical transmittances of the second conducting material and the third conducting material. The method may include, prior to depositing the solution, dispersing the one or more nanoparticles into the one or more composite materials.

The details of one or more implementations are set forth in the accompanying drawings and the description below. Other features, objects, and advantages will be apparent from the description, the drawings, and the claims.

DETAILED DESCRIPTION

Figure 1:
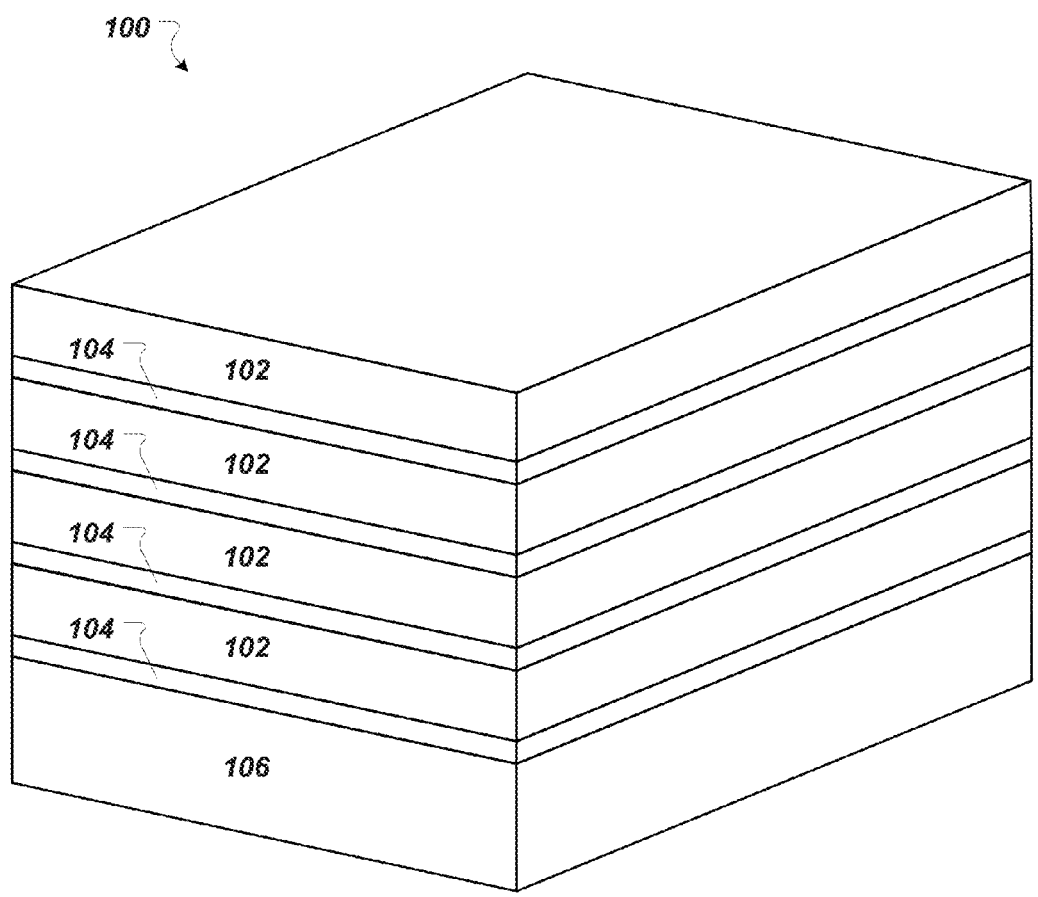
FIG. 1 shows an example of a photonic band gap (PBG) structure with a conducting transparent material in the structure.

FIG. 1 shows an example of a photonic band gap structure 100 with a conducting transparent material as channel layers 102 in the structure 100. The structure 100 includes alternating layers 102 and 104 of the conducting transparent material and a conducting non-transparent material. The structure 100 may include a transparent substrate 106, such as a glass substrate or a polyethylene terephthalate (PET) substrate. The materials of layers 102 and 104 can be chosen based on desired optical and electrical properties of the structure 100.

The conducting transparent material of the channel layer 102 allows for redistribution of the electric field in the structure 100 and subsequent increase in optical transmission. The conducting transparent material may include flexible composites to allow for mechanical flexibility in the structure. The conducting transparent material may facilitate out-of-plane (from layer to layer) or transverse electrical conductivity in the structure 100. The conducting transparent material may exhibit low light absorption. The conducting transparent material may be, for example, indium tin oxide (ITO), a polymer composite, graphene, or a conducting polymer such as poly(3,4-ethylenedioxythiophene) poly(styrenesultonate) (PEDOT:PSS).

The conducting non-transparent materials of the conducting layers 104 provide the main path or backbone for electrical conduction through the structure 100. The conducting non-transparent material exhibits high electron density and mobility and low light absorption. The conducting non-transparent material may be a thin film of metal such as silver, gold, aluminum, copper, lithium, or alkali metal, regioregular poly(3-hexylthiophene-2,5-diyl) (P3HT), a carbon-based conductor such as graphene, a conducting polymer, or a composite material with an electronic conductivity similar to the above materials such as a metal nanowire network structure. Conducting polymer may refer to a class of polymer materials that are electronically conductive.

Figure 2:
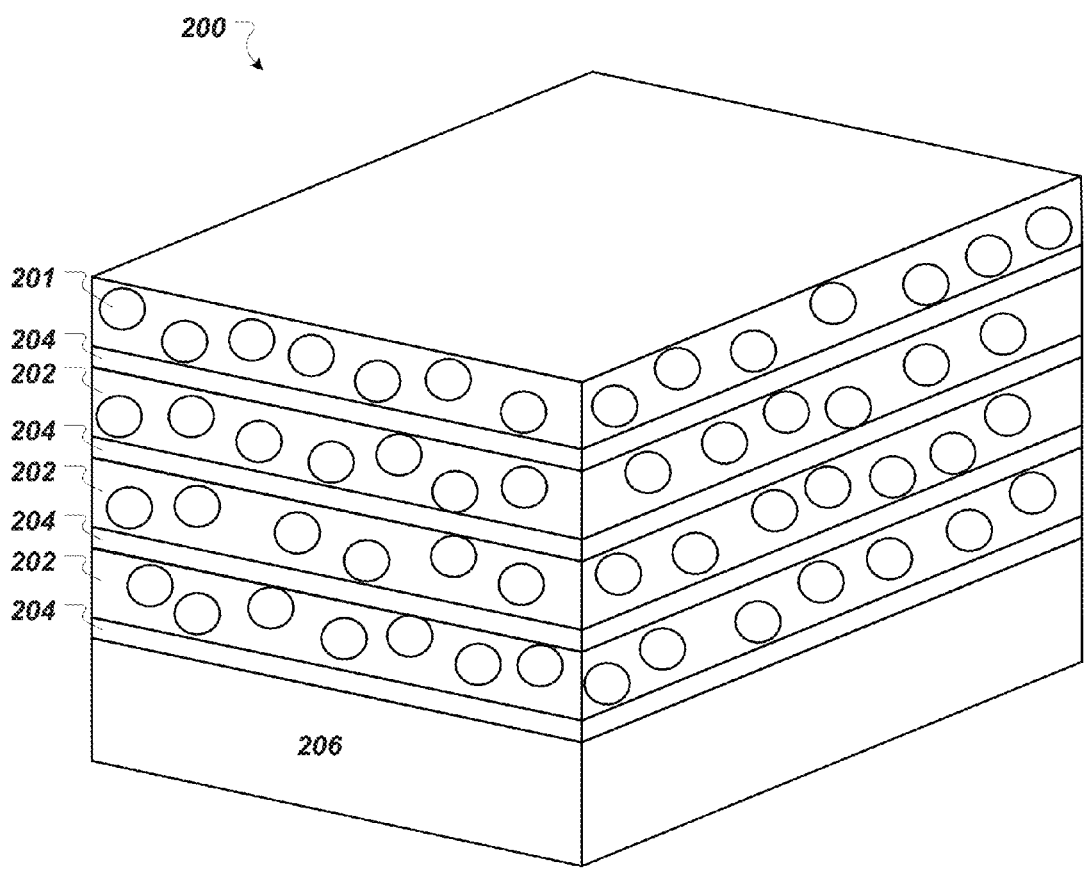
FIG. 2 shows an example of a photonic band gap structure with conductive nanoparticles dispersed within insulating transparent materials.

FIG. 2 shows an example of a photonic band gap structure 200 with nanoparticles 201 dispersed within composite transparent materials of nanocomposite layers 202. The structure 200 includes alternating layers 202 and 204 of the composite transparent material and a conducting non-transparent material. The structure 200 may include a transparent substrate 206, such as a glass substrate or a poly(ethylene terephthalate) (PET) substrate. The materials of layers 202 and 204 can be chosen based on desired optical and electrical properties of the structure 200. The thickness of each of the layers 202 and 204 can be chosen based on the materials of the layers and can be chosen to enhance the concentration of the electric field in the nanocomposite layers 202.

The composite transparent material of the nanocomposite layer 202 allows for redistribution of the electric field in the structure 200 and subsequent increase in optical transmission. The composite transparent material may include flexible composites to allow for mechanical flexibility in the structure. The composite transparent material may exhibit low light absorption. The composite transparent material may be, for example, an insulating polymer such as polystyrene (PS).

In some implementations, the nanoparticles 201 dispersed within the composite materials of the nanocomposite layers 202 may be one or more conductive materials to facilitate out-of-plane (from layer to layer) or transverse electrical conductivity in the structure 200. The nanoparticles 201 may have an average size comparable to the thickness of the nanocomposite layers 202. The aggregate dimension of a nanoparticle 201 may be equal to the thickness of the nanocomposite layer 202 in which it is dispersed to connect adjacent conducting layers 204. The nanoparticles 201 may include, for example, a metal colloids such as silver, gold, aluminum, copper, lithium, or alkali metal colloids, regioregular poly(3-hexylthiophene-2,5-diyl) (P3HT), a carbon-based conductor such as carbon nanotubes or graphene, conducting polymer, or a composite material with an electronic conductivity similar to the above materials such as a metal nanowire network structure.

In some implementations, the nanoparticles 201 dispersed within the composite materials of the nanocomposite layers 202 may be one or more electrochromic or thermochromic materials (e.g., liquid crystals) and photochromic materials (e.g., photochromic dyes) to facilitate a photochromic response of the structure 200. The structure 200 would exhibit a refractive index change in response to electric or optical fields. The resonance effects resulting from the PBG structure 200 may amplify the materials response. The light localization facilitated by the PBG structure 200 may provide for a faster response to electrical, thermal, or optical stimuli as compared to typical switchable glass that switches between light transmission properties. For example, the PBG structure 200 may exhibit fast switching between transparent and light block or filtering states. The conducting layers 204 may provide for effective transmission changes and may be used as heat deflector or source. The PBG structure 200 may be used as, for example, adaptive and electrochromic optical elements and actively responsive (to electrical, thermal, or mechanical stimuli) tunable optical filters.

For example, the PBG structure 200 may include nanocomposite layers 202 that include nanoparticles 201 of liquid crystals to dynamically tune or control optical properties of the PBG structure 200 by, for example, externally inducing switching of orientation of the liquid crystals. When the crystals are oriented in one direction (e.g., a direction perpendicular to the planes of the PBG structure 200), light can be transmitted through the PBG structure 200. When the crystals are oriented in another direction (e.g., a direction that is not perpendicular to the planes of the PBG structure 200), light can be blocked or filtered by the PBG structure 200.

In some implementations, the nanoparticles 201 dispersed within the composite materials of the nanocomposite layers 202 may be one or more nonlinear absorbing materials for power limiting applications. The PBG structure 200 may facilitate light concentration in the nanocomposite layers 202 and may reduce a threshold level intensity and response time for the PBG structure 200 to become active compared to typical switchable glass. The conducting layers 204 of the PBG structure 200 contributes to enhanced absorption in the active state and may mitigate thermal damage to the structure 200. The PBG structure 200 may be used as, for example, coatings for sensor protection and optical filters for aerospace applications.

For example, the PBG structure 200 may include nanocomposite layers 202 that include nanoparticles 201 of two-photon absorbing (TPA) dye particles dispersed in a polymer to facilitate dynamic change of refractive index profile of the structure upon exposure to high intensity irradiation, which may lead to efficient high energy optical power limiting. The presence of the dye particles allows dynamic switching from resonant tunneling to absorbing states due to a non-linear response of the dye particles. Wavelength-selective power limiting of the PBG structure 200 can be achieved by selecting an appropriate dye.

The nanoparticles 201 may be dispersed within the composite material without substantially affecting optical transmittance of the composite material of the nanocomposite layer 202. The optical transmittance of the composite transparent material prior to dispersion of the nanoparticles 201 is thus substantially the same as the optical transmittance of the composite transparent material following dispersion of the nanoparticles into the composite transparent material.

The conducting non-transparent materials of the conducting layers 204 provide the main path or backbone for electrical conduction through the structure 200. The conducting non-transparent material exhibits high electron density and mobility and low light absorption. The conducting non-transparent material may be a thin film of metal such as silver, gold, aluminum, copper, lithium, or alkali metal, regioregular poly(3-hexylthiophene-2,5-diyl) (P3HT), a carbon-based conductor such as graphene, conducting polymer, or a composite material with an electronic conductivity similar to the above materials such as a metal nanowire network structure.

Figure 3:
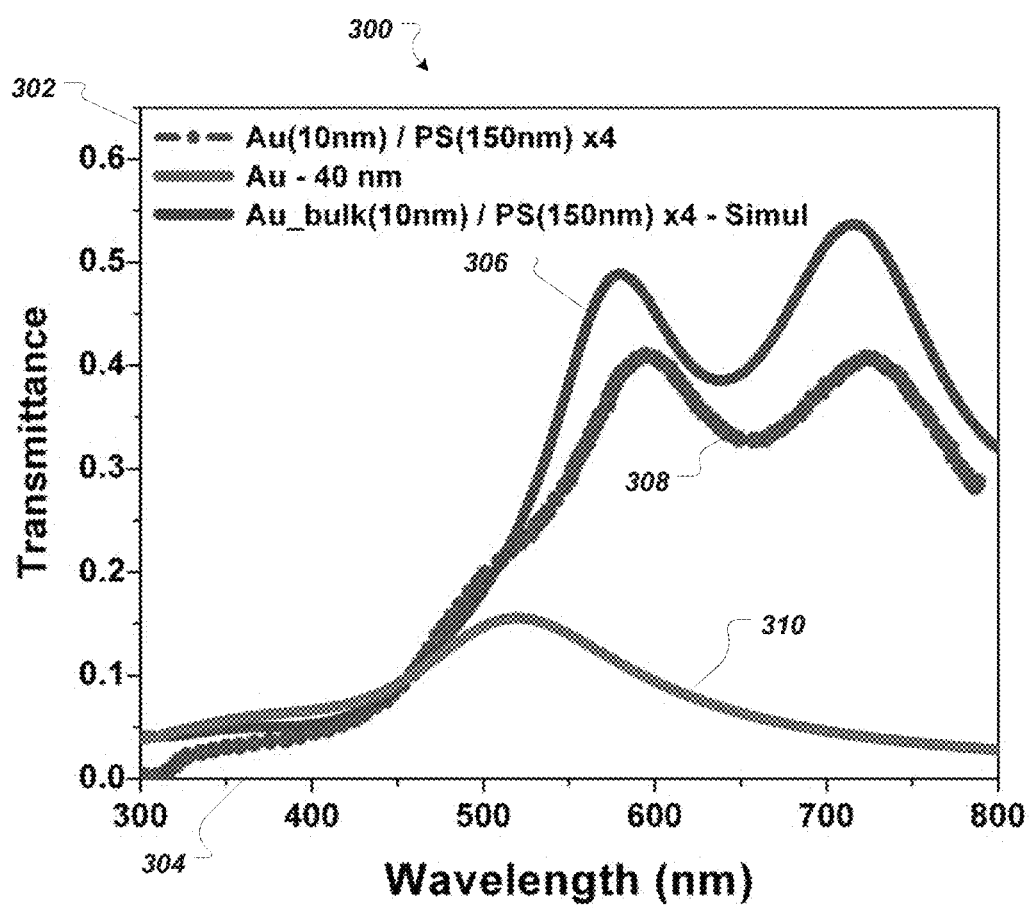
FIG. 3 is a graph showing optical transmittance through a PBG structure compared to optical transmittance through a thick 40 nanometer gold film.

FIG. 3 is a graph 300 showing optical transmittance through a PBG structure compared to optical transmittance through a thick 40 nanometer gold film. The PBG structure may include eight alternating layers of gold film and polystyrene. Each of the four layers of gold film have an average thickness of 10 nanometers (nm). Each of the four layers of polystyrene have an average thickness of 150 nm.

The graph 300 includes axis 302 representing a range of optical transmittance. The graph 300 includes an axis 304 representing a range of wavelength of light being transmitted through the PBG structure and the thick 40 nm gold film. Curve 306 depicts a simulated transmittance versus wavelength characteristic of the PBG structure. Curve 308 depicts an actual transmittance versus wavelength characteristic of the PBG structure. Curve 310 depicts a transmittance versus wavelength characteristic of the 40 nm gold film.

Figure 4:
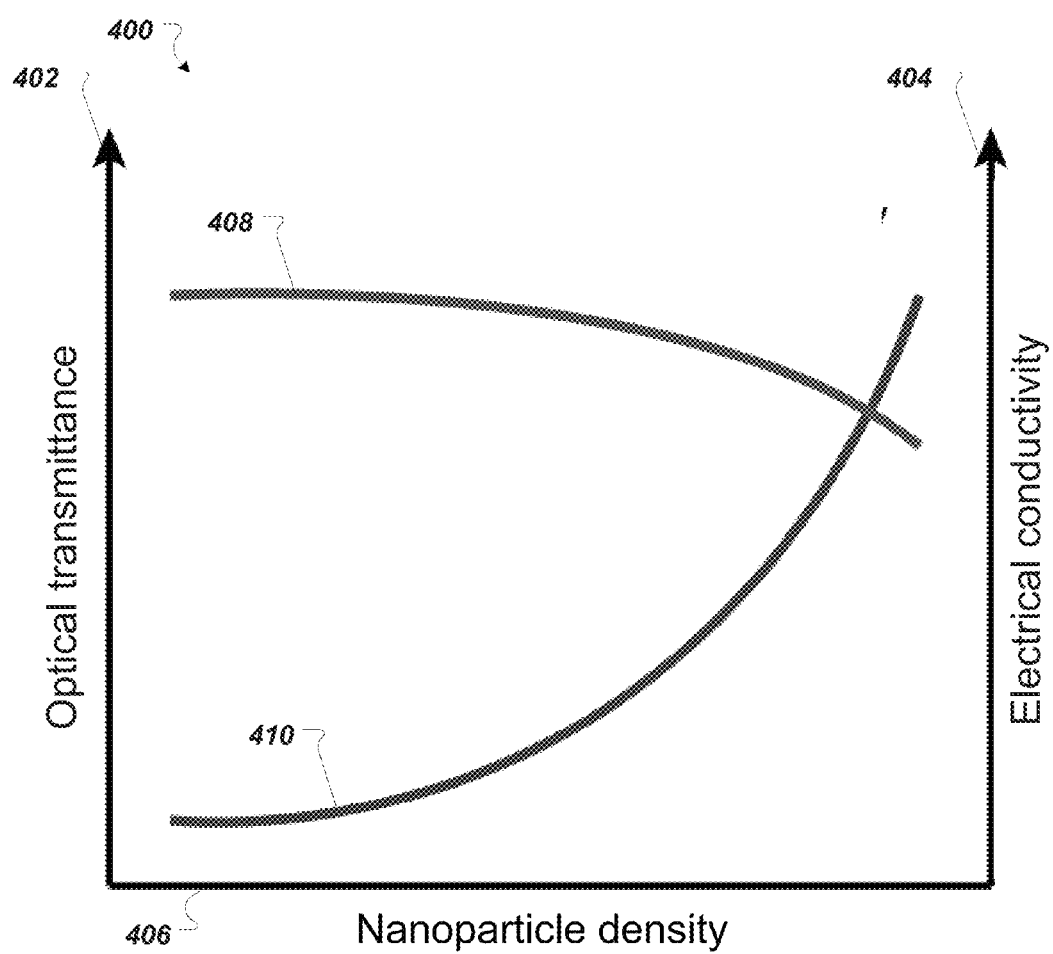
FIG. 4 is a graph showing an example of a variation of electrical conductivity and optical transmittance of a PBG structure with density of nanoparticles.

FIG. 4 is a graph 400 showing an example of a variation of electrical conductivity and optical transmittance of a PBG structure with density of nanoparticles. Axis 402 represents a range of optical transmittance. Axis 404 represents a range of electrical conductivity. Axis 406 represents a range of nanoparticle density. Curve 408 depicts the optical transmittance versus nanoparticle density. Curve 410 depicts the electrical conductivity versus nanoparticle density.

Figure 5:
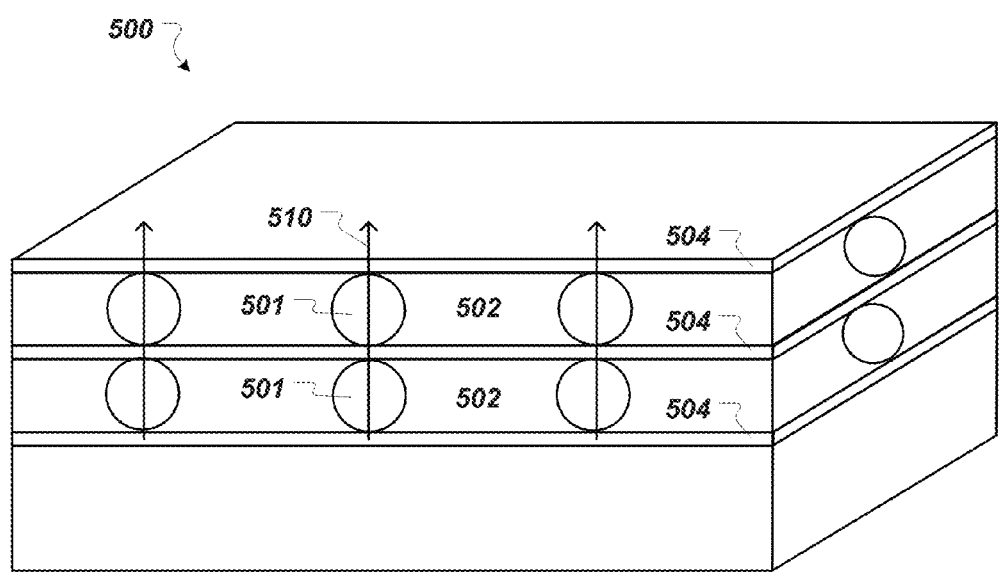
FIG. 5 shows an example of a photonic band gap structure with transverse conductance.

FIG. 5 shows an example of a photonic band gap structure 500 with out-of-plane or transverse conductance shown by arrows 510 between conducting layers 504 through conductive nanoparticles 501 dispersed within nanocomposite layer 502. The nanoparticles 501 form conductive channels between the conducting layers 504 through the nanocomposite layer 502. The transverse conduction may be similar to the conduction of metallic thin films.

Figure 6:
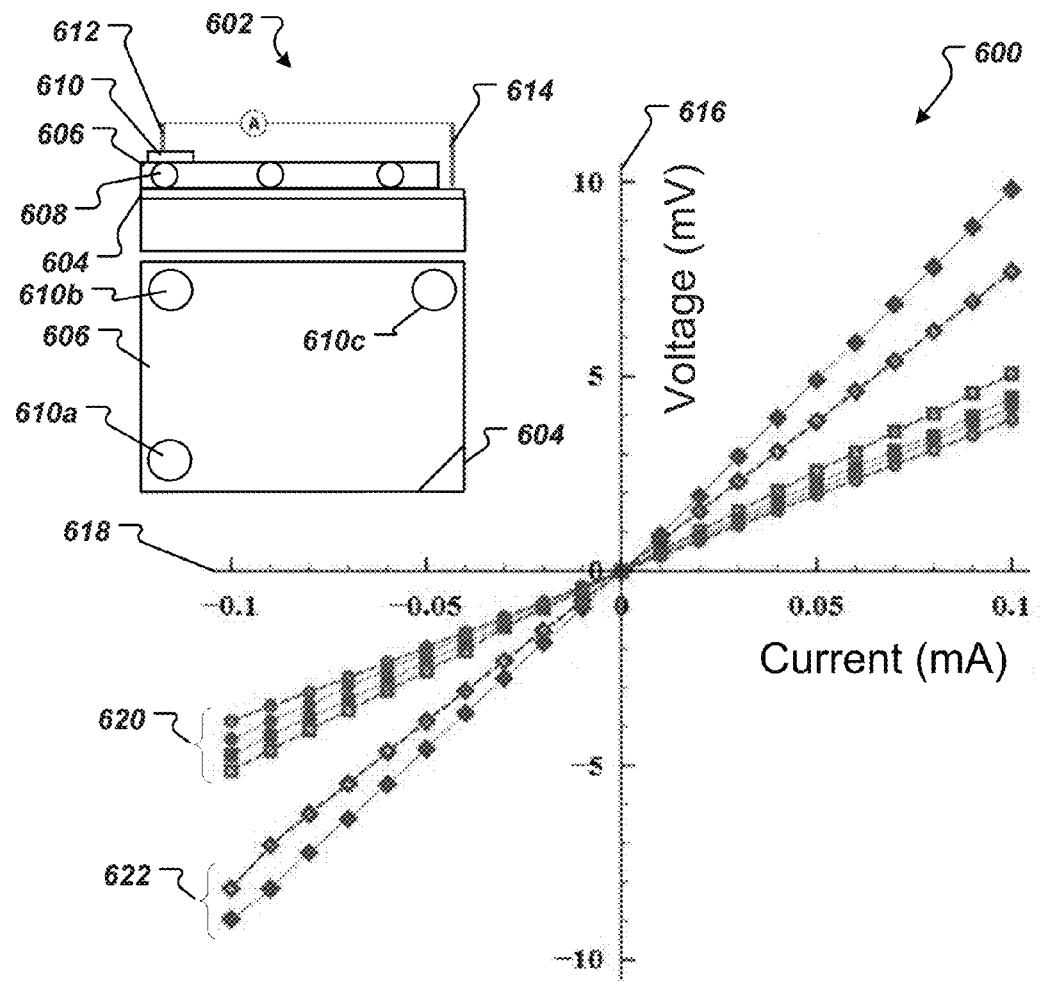
FIG. 6 is a graph showing actual measurements of transverse conductivity of a photonic band gap structure with transverse conductance.

FIG. 6 is a graph 600 showing actual measurements of current versus voltage (I-V) characteristics of a PBG structure 602 with transverse conductance. The PBG structure 602 used to obtain the actual measurements may include a layer of gold 604 and a layer of polystyrene 606 on the layer of gold 604. Gold nanoparticles 608 may be dispersed within the polystyrene 606 to form conductive channels between the layer of gold 604 and gold contacts 610 formed on the layer of polystyrene 606. Two probes 612 and 614 may be used to obtain the measurements. The probe 614 may contact the layer of gold 604. The probe 612 may contact a gold contact 610 formed on the layer of polystyrene 606.

The graph 600 includes an axis 616 representing a range of voltages in millivolts. Axis 618 represents a range of current in milliamps. Curves 620 depict measured I-V characteristics of the PBG structure 602 when probe 612 is in contact with either gold contact 610a or 610c. Curves 622 depict measured I-V characteristics of the PBG structure 602 when probe 612 is in contact with gold contact 610b.

Figure 7:
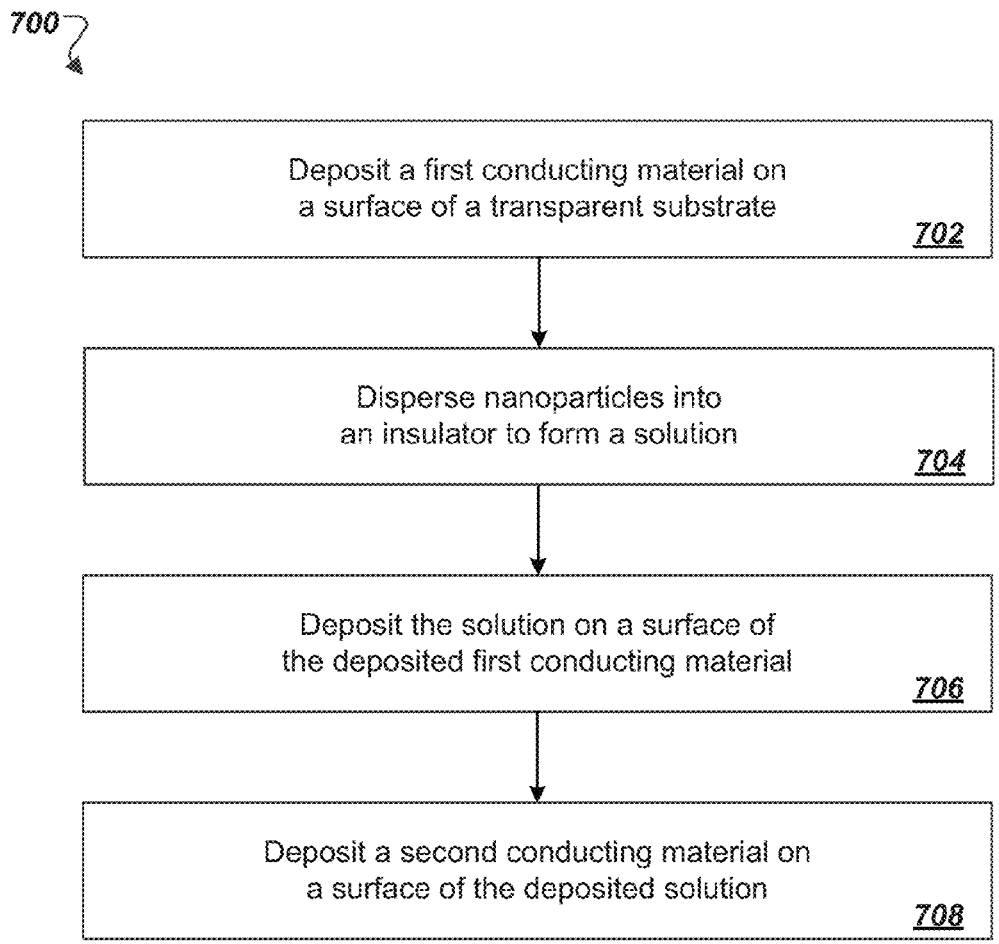
FIG. 7 is a flowchart of an example of a process for forming photonic band gap structures.

FIG. 7 is a flowchart of an example of a process 700 for fabricating a PBG structure. Although the process 700 is described using materials, e.g., conductive nanoparticles, for enhancing transverse conductivity between conducting planes through non-conducting planes of the structure, a process similar to process 700 may be used to fabricate the other PBG structures described above. Briefly, the process 700 includes depositing a first conducting material on a surface of a transparent substrate (702), dispersing nanoparticles into an insulator to form a solution (704), depositing the solution on a surface of the deposited first conducting material (706), and depositing a second conducting material on a surface of the deposited solution (708).

The layers of the conducting material may be deposited using, for example, electron beam evaporation at a rate of 0.5 Å/s inside a chamber maintained under ultra high vacuum conditions (e.g., at a pressure of approximately $10^{-10}$ torr). Each of the layers of conducting material may be deposited to have an average thickness of 10 nm. The conducting material may be a metal, such as silver or gold. Other suitable materials may be used for the conducting material.

The solution may include a polymer matrix of polystyrene of 2 wt % of m.wt 50,000 g/mol dissolved in toluene. When the solution includes an insulating polymer, such as polystyrene, conducting nanoparticles may be dispersed in the insulating polymer to facilitate electrical contact between alternate metal layers through the layer of solution and to realize out-of-plane conductance. The solution may include thiol-terminated polystyrene to help to disperse the nanoparticles within the polystyrene.

The conducting nanoparticles may have average sizes between 65% and 100% of the thickness of the layer of the solution to be deposited. For example, if the thickness of the layer of solution to be deposited is 150 nm, the conducting nanoparticles may have average sizes of 100 nm. The number density of the nanoparticles dispersed in the polystyrene may be below a threshold concentration at which the optical transmittance of the layer of deposited solution is not substantially affected by the addition of the nanoparticles. The threshold concentration may be based on materials included in the solution. The conducting nanoparticles may be metal colloids, such as gold colloids or silver colloids. Other suitable materials may be included in the nanoparticles.

The layer of solution may be deposited on a layer of conducting material by, for example, spin coating of the solution onto the layer of conducting material at optimized rotation speeds (e.g., 4000 revolutions per minute (rpm) for 30 seconds). The rotation speed may be varied between 1500 and 4000 rpm. The solution may be deposited to have an average thickness of 150 nm. Other suitable materials may be used for the solution.

An eight layer PBG structure may be prepared by alternately depositing four layers of conducting material and four layers of solution on a glass substrate. In an eight layer PBG structure, the aggregate thickness of the conducting material may be approximately 40 nm interspersed with layers of solution.

A number of implementations have been described. Nevertheless, various modifications can be made without departing from the spirit and scope of the processes and techniques described herein. In addition, the processes depicted in the figures do not require the particular order shown, or sequential order, to achieve desirable results. In addition, other steps can be provided, or steps can be eliminated, from the described processes, and other components can be added to, or removed from, the describe apparatus and systems. Accordingly, other embodiments are within the scope of the following claims.

What is claimed is:

1. A photonic band gap (PBG) structure, comprising:
    a first conducting layer;
    a second conducting layer; and
    a nanocomposite layer between the first conducting layer and the second conducting layer, the nanocomposite layer comprising one or more composite materials and one or more nanoparticles dispersed within the one or more composite materials, with the one or more composite materials comprising an insulating material that is optically transparent, the one or more nanoparticles comprising a conducting material, and the one or more nanoparticles forming one or more respective conductive channels through the insulating material of the nanocomposite layer to electrically connect the first conducting layer and the second conducting layer;
    wherein an aggregate thickness of the first conducting layer, the second conducting layer, and the nanocomposite layer increases a concentration of light in the nanocomposite layer, relative to other concentrations of light in the nanocomposite layer that result from other aggregate thicknesses of the first conducting layer, the second conducting layer, and the nanocomposite layer; and
    wherein the increase in the concentration of light in the nanocomposite layer causes an increase in optical transmittances of the first conducting layer and the second conducting layer, relative to other optical transmittances of the first conducting layer and the second conducting layer.

2. The PBG structure of claim 1, wherein the first conducting layer has an average thickness of 10 nanometers.

3. The PBG structure of claim 2, wherein the second conducting layer has an average thickness of 10 nanometers.

4. The PBG structure of claim 1, wherein the nanocomposite layer has an average thickness of 150 nanometers.

5. The PBG structure of claim 1, wherein each of the first conducting layer and the second conducting layer comprises one or more of silver, gold, aluminum, copper, lithium, poly(3-hexylthiophene-2,5-diyl) (P3HT), carbon, and conducting polymer.

6. The PBG structure of claim 1, wherein the one or more composite materials of the nanocomposite layer comprises an insulating polymer.

7. The PBG structure of claim 6, wherein the polymer comprises polystyrene.

8. The PBG structure of claim 1, wherein the conducting material comprises one or more of silver, gold, aluminum, copper, lithium, poly(3-hexylthiophene-2,5-diyl) (P3HT), carbon, tin, indium, and conducting polymer.

9. The PBG structure of claim 1, wherein an average size of the one or more nanoparticles is 100 nanometers.

10. The PBG structure of claim 1, wherein the one or more nanoparticles of the nanocomposite layer comprise one or more electrochromic, thermochromic, and photochromic materials.

11. The PBG structure of claim 1, wherein the one or more nanoparticles of the nanocomposite layer comprise one or more nonlinear absorbing materials or liquid crystalline materials.

12. The PBG structure of claim 1, wherein a first optical transmittance of the one or more composite materials prior to dispersion of the one or more nanoparticles into the one or more composite materials is substantially the same as a second optical transmittance of the one or more composite materials following dispersion of the one or more nanoparticles into the one or more composite materials.

13. The PBG structure of claim 1, further comprising:
    a transparent substrate on which the first conducting layer is formed.

14. The PBG structure of claim 1, further comprising:
    a third conducting layer; and
    another nanocomposite layer between the second conducting layer and the third conducting layer, with the other nanocomposite layer comprising one or more other composite materials and one or more other nanoparticles dispersed within the one or more other composite materials, with the one or more other composite materials comprising a material that is optically transparent;
    wherein an aggregate thickness of the second conducting layer, the third conducting layer, and the other nanocomposite layer increases a concentration of light in the other nanocomposite layer, relative to other concentrations of light in the other nanocomposite layer that result from other aggregate thicknesses of the second conducting layer, the third conducting layer, and the other nanocomposite layer; and
    wherein the increase in the concentration of light in the other nanocomposite layer causes an increase in optical transmittances of the second conducting layer and the third conducting layer, relative to other optical transmittances of the second conducting layer and the third conducting layer.

15. A method for forming a photonic band gap (PBG) structure, the method comprising:
    depositing a first conducting material on a surface of a transparent substrate;
    depositing a solution on a surface of the deposited first conducting material, with the solution comprising one or more composite materials and one or more nanoparticles dispersed within the one or more composite materials, with the one or more composite materials comprising an insulating material that is optically transparent, the one or more nanoparticles comprising a conducting material, and the one or more nanoparticles forming one or more respective conductive channels through the insulating material of the nanocomposite layer to electrically connect the first conducting layer and the second conducting layer; and
    depositing a second conducting material on a surface of the deposited solution,
    wherein an aggregate thickness of the deposited first conducting layer, the deposited second conducting layer, and the deposited solution increases a concentration of light in the deposited solution, relative to other concentrations of light in the solution that result from other aggregate thicknesses of the first conducting material, the second conducting material, and the solution; and
    wherein the increase in the concentration of light in the deposited solution causes an increase in optical transmittances of the deposited first conducting material and the deposited second conducting material, relative to other optical transmittances of the first conducting material and the second conducting material.

16. The method of claim 15, wherein depositing the first conducting material on the surface of the transparent substrate comprises:
depositing the first conducting material using electron beam evaporation at an average rate of 0.5 Å/s under an average pressure of $\sim 1\times 10^{-10}$ torr.

17. The method of claim 15, wherein depositing the second conducting material on the surface of the deposited solution comprises:
depositing the second conducting material using electron beam evaporation at an average rate of 0.5 Å/s under an average pressure of $\sim 1\times 10^{-10}$ torr.

18. The method of claim 15, wherein at least one of the deposited first conducting material or the deposited second conducting material has an average thickness of 10 nanometers.

19. The method of claim 15, wherein each of the first conducting material and the second conducting material comprises one or more of silver, gold, aluminum, copper, lithium, poly(3-hexylthiophene-2,5-diyl) (P3HT), carbon, tin, indium, and a conducting polymer.

20. The method of claim 15, wherein depositing the solution on the surface of the first conducting material comprises:
spin coating the solution onto the surface of the first conducting material at an average rotation speed between 1500 rpm and 4000 rpm for an average time of 30 seconds.

21. The method of claim 15, wherein the deposited solution has an average thickness of 150 nanometers.

22. The method of claim 15, wherein the one or more composite materials comprises polystyrene of 2 wt % of m.wt 50,000 g/mol.

23. The method of claim 15, wherein the conducting material comprises one or more of silver, gold, aluminum, copper, lithium, poly(3-hexylthiophene-2,5-diyl) (P3HT), carbon, tin, indium, and a conducting polymer.

24. The method of claim 15, wherein an average size of the one or more nanoparticles is 100 nanometers.

25. The method of claim 15, wherein the one or more nanoparticles of the nanocomposite layer comprise one or more electrochromic, thermochromic and photochromic materials.

26. The method of claim 15, wherein the one or more nanoparticles of the nanocomposite layer comprise one or more nonlinear absorbing materials or liquid crystalline materials.

27. The method of claim 15, wherein a first optical transmittance of the one or more composite materials prior to dispersion of the one or more nanoparticles into the one or more composite materials is substantially the same as a second optical transmittance of the one or more composite materials following dispersion of the one or more nanoparticles into the one or more composite materials.

28. The method of claim 15, further comprising:
depositing another solution on a surface of the deposited second conducting material, with the other solution comprising another one or more composite materials and one or more other nanoparticles dispersed within the other one or more composite materials, with the one or more composite materials comprising a material that is optically transparent; and
depositing a third conducting material on a surface of the deposited other solution,
wherein an aggregate thickness of the deposited second conducting layer, the deposited third conducting layer, and the deposited other solution increases a concentration of light in the deposited other solution, relative to other concentrations of light in the other solution that result from other aggregate thicknesses of the second conducting material, the third conducting material, and the other solution; and
wherein the increase in the concentration of light in the deposited other solution causes an increase in optical transmittances of the deposited second conducting material and the deposited third conducting material, relative to other optical transmittances of the second conducting material and the third conducting material.

29. The method of claim 15, further comprising:
prior to depositing the solution, dispersing the one or more nanoparticles into the one or more composite materials.

30. A photonic band gap (PBG) structure, comprising:
a first gold layer having an average thickness of 10 nanometers;
a second gold layer having an average thickness of 10 nanometers; and
a nanocomposite layer between the first gold layer and the second gold layer, the nanocomposite layer having an average thickness of 150 nanometers, the nanocomposite layer comprising one or more gold nanoparticles having an average size of 100 nanometers dispersed in polystyrene that is optically transparent and mechanically flexible, with the one or more gold nanoparticles forming one or more respective conductive channels through the nanocomposite layer and between the first gold layer and the second gold layer, and with a first optical transmittance of the polystyrene prior to dispersion of the one or more gold nanoparticles into the polystyrene is substantially the same as a second optical transmittance of the polystyrene following dispersion of the one or more gold nanoparticles into the polystyrene;
wherein an aggregate thickness of the first gold layer, the second gold layer, and the nanocomposite layer increases a concentration of light in the nanocomposite layer, relative to other concentrations of light in the nanocomposite layer that result from other aggregate thicknesses of the first gold layer, the second gold layer, and the nanocomposite layer; and
wherein the increase in the concentration of light in the nanocomposite layer causes an increase in optical transmittances of the first gold layer and the second gold layer, relative to other optical transmittances of the first gold layer and the second gold layer.

* * * * *